United States Patent [19]

Schwee et al.

[11] 3,846,770

[45] Nov. 5, 1974

[54] SERIAL ACCESS MEMORY USING MAGNETIC DOMAINS IN THIN FILM STRIPS

[75] Inventors: Leonard J. Schwee, Colesville; Henry R. Irons, Adelphi, both of Md.

[73] Assignee: The United States of America as represented by the Secretary of the Navy, Washington, D.C.

[22] Filed: July 11, 1973

[21] Appl. No.: 378,296

[52] U.S. Cl.....................340/174 FB, 340/174 EB, 340/174 HA, 340/174 RF, 340/174 TF, 340/174 YC

[51] Int. Cl............................................... G11c 11/14

[58] Field of Search................. 340/174 TF, 174 FB

[56] References Cited

UNITED STATES PATENTS

| | | | |
|---|---|---|---|
| 3,540,020 | 11/1970 | Schwartz | 340/174 TF |
| 3,553,661 | 1/1971 | Hadden, Jr. | 340/174 FB |
| 3,701,129 | 10/1972 | Copeland, III | 340/174 VA |
| 3,736,579 | 5/1973 | Marsh | 340/174 TF |

OTHER PUBLICATIONS

Journal of Applied Physics – Vol. 42, No. 1; Mar. 15, 1971, pages 1812–1814

IEEE Transactions on Magnetics – Vol. Mag–2, No. 3, Sept. 1966, pages 347–351

*Primary Examiner*—James W. Moffitt

*Attorney, Agent, or Firm*—R. S. Sciascia; J. A. Cooke; Sol Sheinbein

[57] ABSTRACT

A polycrystalline thin film strip to store information in a serial manner in the form of reversal domains. The reversal domains are propagated along the thin film strip, which may be Permalloy, and then sensed to detect the stored digital information.

4 Claims, 12 Drawing Figures

SERIAL ACCESS MEMORY USING MAGNETIC DOMAINS IN THIN FILM STRIPS

BACKGROUND OF THE INVENTION

This invention is directed to magnetic storage devices, and more specifically to a magnetic serial access memory.

Electronic computers and other data processing devices are largely limited by the speed, capacity and reliability of their memory systems. Systems currently in use include tiny ring shaped ferrite cores strung on a mesh of fine wires and transistor circuit laid down on tiny chips of silicon. Both these systems are extremely expensive however.

An alternative currently under development exploits a new technology in which data bits are stored in the form of magnetic "bubbles" moving in thin films of magnetic material. The bubbles are actually cylindrical magnetic domains whose polarization is opposite to that of the thin magnetic film in which they are embedded. The bubbles are stable over a considerable range of conditions and can be moved from point to point at high velocity. Magnetic bubble memories are both substantially cheaper than core memories and much faster than magnetic disk memory systems now widely used for high capacity storage. Magnetic bubble memories are analogous to magnetic disk memories in that in both systems information is stored as states on, or in, a thin magnetic film. In a disk memory the film is moved mechnically at high speed; in a bubble memory the bubble moves at high speed throughout the film. Many logical operations can be performed in bubble devices without reading the stored data out and writing them back in again. Inasmuch as bubble devices have no moving parts, they should work reliably for many years.

One drawback of bubble devices is that single crystals with few defects are required to store them, and it is extremely difficult to produce large single crystal devices. Even the use of amorphous materials does not eliminate all problems due to high eddy currents reducing the speed of the bubble domains.

SUMMARY OF THE INVENTION

Accordingly, this invention provides a polycrystalline serial access memory using strips. After being demagnetized, reversal domains storing the digital information are created in the strips. The reversal domains are then propagated along the hard axis of the strips by applying current through conductors placed above the strip. The reversal domains are then detected by conventional sensing devices.

OBJECTS OF THE INVENTION

It is therefore an object of the present invention to provide a magnetic storage device requiring the use of only polycrystalline material.

Another object of the present invention is to provide a serial access storage devices.

Yet another object of the present invention is to provide an inexpensive and compact memory device.

Still another object of the present invention is to provide a magnetic serial access fast propagating memory device.

A further object of the present invention is to store information in the form of reversal domains in thin film strips, and propagate them along the hard axis.

A still further object of the present invention is to provide a magnetic serial access memory having greater data density.

BRIEF DESCRIPTION OF THE DRAWINGS

Still other objects, advantages and features will become apparent to those of ordinary skill in the art by reference to the following detailed descriptions of a preferred embodiment of the apparatus and the appended claims. The various features of the exemplary embodiments according to the invention may be best understood with reference to the accompanying drawings, wherein:

DESCRIPTION OF THE PREFERRED EMBODIMENT

Small reversal domains can be found in thin film strips. Several methods may be utilized to etch the film into strips. One method entails the use of photolithegraphy to obtain strips of 16 μm wide. Another method utilizes moving a tungsten needle, at 8 volts above the film potential, over the film. The film burns off where contact is made within the needle. The strips, of thin film material, which may be polycrystalline such as 80–20 NiFe, are approximately 25 μm wide and are demagnetized without an external field present. Demagnetization may be achieved by applying a hard axis field and reducing it to zero or by applying a large positive easy axis field followed by a small negative easy axis field. The domain pattern resulting differs depending on the method and the thickness of the film.

Figures 1A, 1B, 1C, 2A, 2B, 2C:
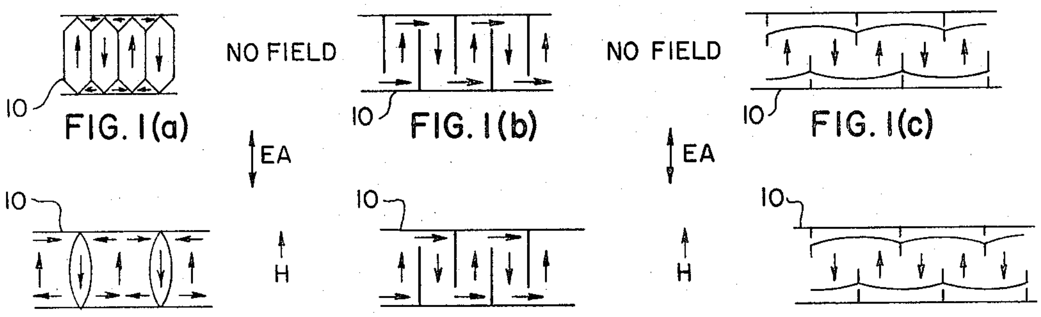
FIGS. 1(*a*) through 1(*c*) illustrate a schematic view of various types of demagnetized stages in magnetic thin film strips.
FIGS. 2(*a*) through 2(*c*) illustrate various reversal domains in magnetic thin film strips corresponding to the demagnetized states of FIGS. 1(*a*) through 1(*c*) respectively.

Referring now to FIGS. 1(*a*) through 1(*c*), there is illustrated three different types of demagnetized states observed in thin films. The demagnetized state shown in FIG. 1(*a*) was observed in films between 200 A and 640 A thick and results from easy axis demagnetizing fields. The demagnetized state shown in FIG. 1(*b*) results from a hard axis field and noted in films between 180 A and 640 A, and the demagnetized state shown in FIG. 1(*c*) results from easy axis demagnetizating fields in a 180 A thick film.

The magnetization along the edges of the strip 10 is along the hard axis. This reduces magnetic charge accumulation at the strip edges. The different types of demagnetized states result from the direction the hard axis magnetization takes along the strip edges and this can be controlled by the method used to demagnetize the strip.

When an easy axis field H is applied along the width of the strip 10 some domains with magnetization antiparallel to the applied field collapse until there is enough distance between remaining reversal domains for stability. The easy axis field is not sufficient to rotate the magnetization along the strip edges into the easy direction. FIGS. 2(*a*) through 2(*c*) illustrate stable reversal domains under the influence of an easy-axis field corresponding to the initial respective initial condition shown in FIGS. 1(*a*) through 1(*c*).

The domains do not all collapse at the same field but there is a range of bias field over which none collapse and none nucleate. The narrower the strips, the larger the easy bias field can be before any collapse. On a strip 8 μm wide and 305 A thick a field of 21 Oe is needed to collapse all reversal domains. On a 25 μm wide strip of the same thickness, 12 Oe is sufficient to collapse some domains, while none collapsed below 10 Oe. On wider strips the bias field could be reduced to zero without spontaneous nucleation of new reversal domains. With the narrower strips, new reversal domains could nucleate if the bias field were lower than about 2 Oe.

As the bias field is increased, the reversal domains become narrower until they collapse. As the bias field is reduced, the reversal domains become wider. The domains shown in FIG. 2(*a*) collapse at slightly higher fields than the domains shown in FIG. 2(*b*). Relatively small hard axis field is applied. If a small hard axis field is applied opposite the hard axis direction of magnetization along the strip edges shown in FIG. 1(*b*), the biased domains of FIG. 2(*b*) will change to the type shown in FIG. 2(*a*).

It is not necessary that the strip be etched with its length perpendicular to the easy axis. A strip etched at 45° to the easy axis can support reversal domains but collapse occurs at a much smaller field. At this angle, the reversal domain combines properties of bubbles and the domains used in domain tip propagation. It is therefore possible for the reversal domain to turn the corner and be propagated as a domain tip. In the 180 A thick film some domains are bounded by Neel walls of opposite polarity. A larger field is required to collapse these domains because the walls repel each other. By applying a small hard axis field it is possible to lock one of the walls and move the other when the easy axis field is varied. The one wall has less energy in this situation and is more free to move.

Each domain can be considered a "1" and its absence a "0." To generate such a domain a wire is fixed over the strip to give a localized field opposite to the bias field to nucleate a reversal domain.

Figure 3:
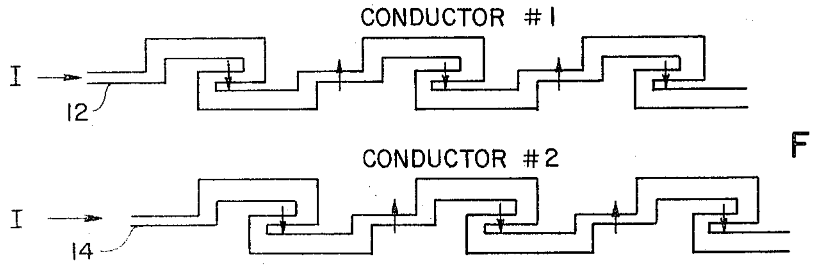
FIG. 3 illustrates the conductors and their relationship to each other to produce the propagating field.
Figure 4A:
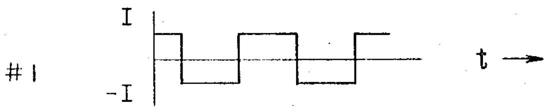
FIGS. 4(*a*) and 4(*b*) illustrate the currents applied to the conductors of FIG. 3 to produce the required propagating field.
Figure 4B:
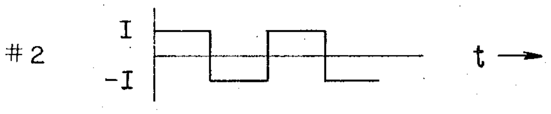

Propagation of the stable reversal domains along the hard axis can be achieved by effecting a gradiant field which changes the strength of the bias field periodically along the magnetic strip. When such a pattern is made to move along the strip, the stable reversal domains will follow. One such scheme, as shown in FIG. 3, is placing a set of conductors 12, 14 over the thin film strip. These conductors must be superimposed with an insulating film between them and displaced as shown. FIG. 4(*a*) shows the current as a function of time applied to conductor 12 and FIG. 4(*b*) shows the current as a function of time applied to conductor 14. These currents produce localized field which add or subtract from the uniform static field resulting in propagation fields.

Figure 5:
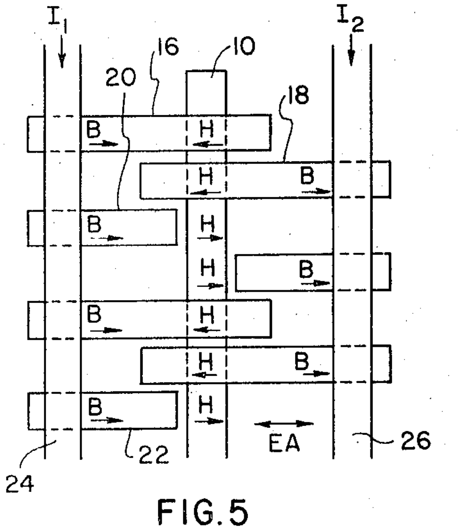
FIG. 5 illustrates an alternative scheme to produce the propagating field.
Figure 6:
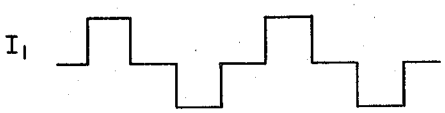
FIGS. 6(*a*) and 6(*b*) illustrate the currents applied to the conductors of FIG. 5 to produce the required propagating field.
Figure 6:
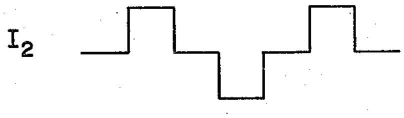

An alternate method for generating the propagation fields is illustrated in FIG. 5. The longer thick thin film strips such as those illustrated as 16, 18 are above the thin film strip 10 and produce a field in the thin film strip 10 opposite to the direction of B due to current in conductors 24, 26. The short thick film strips such as those illustrated as 20, 22 are in the same place as the thin film strip 10 and produce an H field in the same direction as B which is due to the current in conductors 24, 26. FIG. 6(*a*) and 6(*b*) illustrates the variation in current through conductors 24 and 26, respectively.

Detection of a reversal domain can be accomplished in several ways. One such method can be a wire placed above and perpendicular to the strip. At a frequency of about 600 MHz, ferromagnetic resonance will occur if the magnetization is along the easy axis bias field. When a reversal domain passes beneath the wire, resonance will not occur and the change in absorbed r.f. signal can be selected. Another method is to sense the domain inductively by a conductor loop as shown in U. S. Pat. No. 3,508,222. The time change of magnetic flux associated with the domain causes an output signal in a conductor loop. Another sensing scheme employs the Kerr or Faraday effect of optical polarization techniques wherein the presence or absence of domains will differently affect the passage of polarized light through the magnetic sheet. An example of this scheme is shown in U.S. Pat. No. 3,515,456. Another scheme employs magnetoresistance changes wherein magnetoresistive elements undergo a resistance change in the presence of cylindrical domains. U.S. Pat. No. 3,691,540 describes one such sensing device. Another sensing device employs the Hall effect by placing a semiconductor element adjacent to the path followed by a domain and the Hall voltage developed as a result of the stray magnetic field of the domain is sensed.

Thus it is apparent that there has been provided by this invention reversal domains in a polycrystalline storage device analogous to bubbles in its having similar stability conditions although their geometry is 90° different from bubbles. Such domains behave like bubbles viewed from the side except that they taper to tips at the strip edges. The easy axis is perpendicular to the length of the strip and the reversal domains are stable with a field applied along the easy axis. Although the coercive force is 1 Oe to 2 Oe, fields as large as 21 Oe have been applied before all of the domains collapse. The narrower the strip, the larger the bias field can be before collapse. The double wall phenomenon found in films about 150 A thick can also increase the stability range. Although two dimensional propagation is not possible as in bubbles, one dimension is all that is required for a serial access memory. The advantages of a polycrystalline material like Permalloy over the single crystals required for bubbles make reversal domains an important storage device.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A magnetic storage system comprising:

a polycrystalline thin film strip approximately 25 μm wide;

means for placing reversal domains on said strip;

an easy axis field applied along the width of strip whereby several reversal domains collapse enabling the remaining reversal domains to be stable;

means producing a field for propagating said reversal domains along the hard axis; and conductor means for sensing said reversal domains on said strip.

2. A magnetic storage system is recited in claim 1 wherein:

said propagating means comprises conductors placed above said strip.

3. A magnetic storage system as recited in claim 1 wherein said propagating means comprises thick film strips placed above said strip.

4. A magnetic storage system as recited in claim 1 wherein a reversal domain represents a digital one and its absence a digital zero.

* * * * *